UNITED STATES PATENT OFFICE.

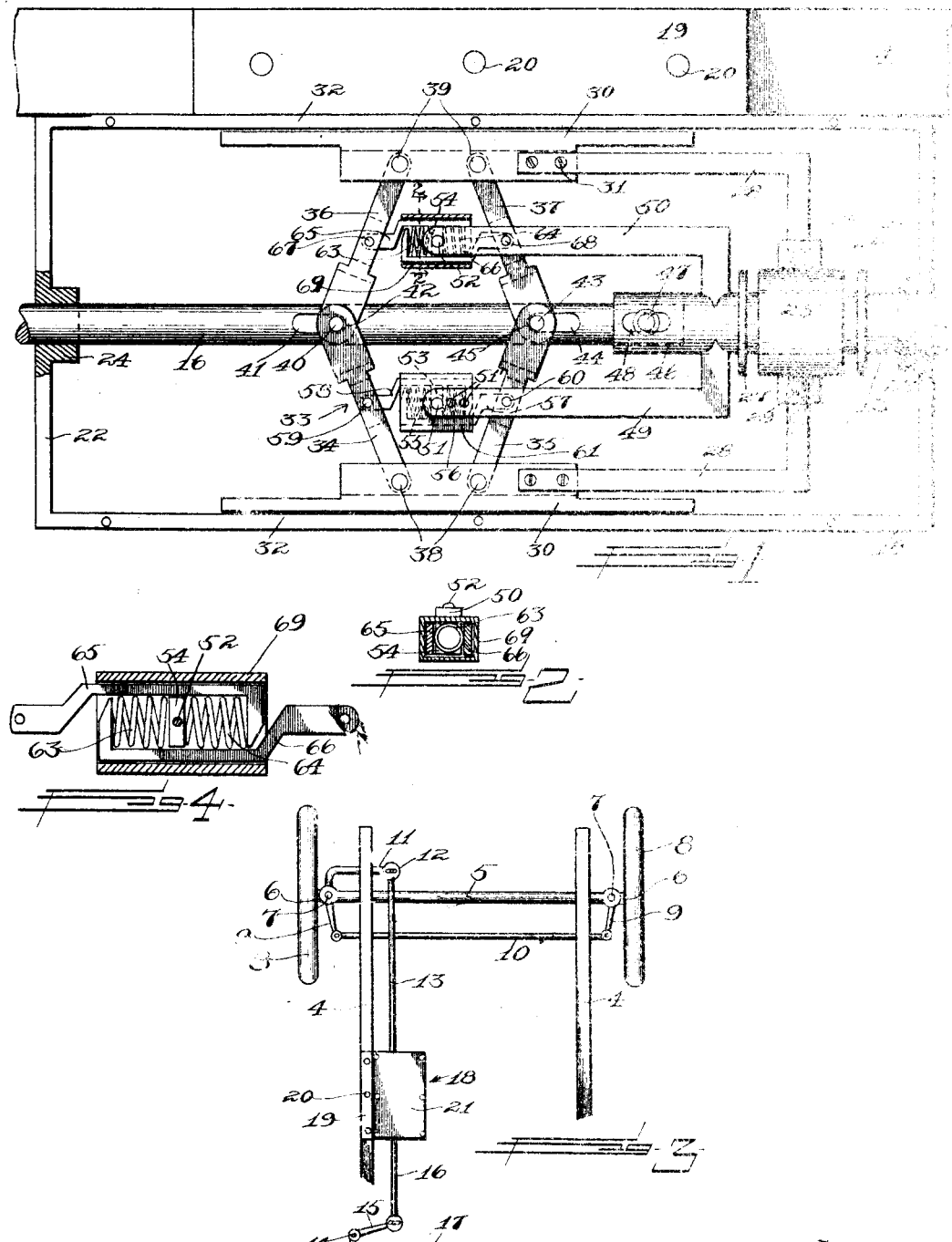

GORDON A. REAM, OF BUFFALO, NEW YORK.

STEERING MECHANISM FOR AUTOMOBILES.

1,112,931.

Specification of Letters Patent.

Patented Sept. 29, 1914.

Application filed July 31, 1913. Serial No. 782,245.

*To all whom it may concern:*

Be it known that I, GORDON A. REAM, a citizen of the United States, residing at Buffalo, in the county of Erie and State of New York, have invented certain new and useful Improvements in Steering Mechanism for Automobiles, of which the following is a specification.

My invention relates to steering mechanism for automobiles and has particular reference to means of this character which is so constructed that the steering handle or member, normally held by the operator, may be readily turned by him for swinging the steering wheels of the vehicle but positively prevented from being moved or turned by the swinging movement of the steering wheels.

An important object of this invention is to provide means of the above mentioned character, which will eliminate the vibrations and shocks to the steering handle or member, which is normally held by the operator, due to the steering wheels striking curbs, stones or other obstructions in the roadway, whereby the steering handle or member will not be torn or jerked from the hands of the operator and the automobile caused to suddenly leave its course of travel.

A further object of this invention is to provide steering mechanism of the above mentioned character, which is simple in construction, cheap to manufacture, strong and durable.

Other objects and advantages of this invention will be apparent during the course of the following description.

In the accompanying drawings, forming a part of this specification and in which like numerals are employed to designate like parts throughout the same, Figure 1 is an enlarged plan view of the check means, Fig. 2 is a transverse sectional view taken on line 2—2 of Fig. 1, Fig. 3 is a plan view of the steering mechanism complete, and, Fig. 4 is a detail longitudinal sectional view through the yielding connecting means.

In the drawings, wherein for the purpose of illustration, I have shown a preferred embodiment of my invention, the numeral 4 designates the longitudinal beams of the frame of an automobile, which are connected in the usual manner with a stationary front axle 5, as is customary. The axle 5 has its ends forked for receiving stub-axles 6, pivotally connected therewith, as shown at 7. The stub-axles 6 carry steering wheels 8. Rigidly connected with the stub-axles 6 are rearwardly extending arms 9, which are pivotally connected by a transverse rod 10, as shown. Rigidly connected with one of the stub-axles 6 is a forward steering arm 11, having pivotal connection, as shown at 12, with a forward longitudinal rod 13.

The numeral 14 designates an upstanding steering post, preferably arranged at the left side of the automobile. At its lower end this steering post has an inwardly extending arm 15, rigidly connected therewith, having pivotal connection with a rear longitudinal rod 16. Rigidly connected with the upper end of the steering post 14 is a steering handle or member 17, which is adapted to be held in the hands of the operator, as is customary.

The numeral 18 designates a casing or housing, provided upon one longitudinal edge with a laterally extending flange 19, which is rigidly connected with one longitudinal beam 4 by means of bolts 20 or the like. The top of the casing 18 is normally closed by a removable top or lid 21, as shown. The ends 22 of the casing 18 are provided with bearings 23 and 24, for receiving respectively the forward and rear longitudinal rods 13 and 16. Slidably mounted upon the forward longitudinal rod 13 is a sleeve 25, disposed between stop rings or flanges 26 and 27, which serve to positively limit the longitudinal movement of the sleeve 25 in both directions. Disposed upon opposite sides of the sleeve 25 are rearwardly extending L-shaped arms 28, having pivotal connection with the sleeve 25, as shown at 29. The L-shaped arms 28 are connected with check or brake shoes 30, as shown at 31. These shoes are disposed upon opposite sides of the rear longitudinal rod 16 and are adapted to engage with the longitudinal sides 32 of the casing or housing 18, as shown. The numeral 33 designates a toggle-joint structure, comprising arms or levers 34, 35, 36, and 37. At their outer ends, the arms or levers 34 and 35 are pivotally connected with the adjacent shoe 30, as shown at 38. The outer ends of the arms 36 and 37 are pivotally connected with the adjacent shoe 30, as shown at 39. The inner ends of the arms or levers 34 and 36 are provided with openings for receiving a pin or bolt 40, extending into a longitudinal slot 41, formed in the rear longitudinal rod 16. The pin or bolt 40 is normally disposed in engagement with the forward end wall 42 of the slot or opening 41. The inner ends of the arms or levers 35 and 37 are provided with openings for receiving a pin or bolt 43, disposed within a longitudinal opening or slot 44, such pin or bolt normally engaging the rear end wall 45 of the longitudinal opening or slot 44.

At its rear end the forward longitudinal rod 13 is provided with an opening or recess 46, for receiving the forward end of the rear longitudinal rod 16, as shown. Rigidly connected with the forward end of the rod 16 is a transverse pin or bolt 47, operating within elongated slot or slots 48, formed in the rear end of the rod 13, as shown. The pin or bolt 47 is normally disposed in the central portion of the slot or slots 48, whereby the rod 16 may partake of restricted longitudinal movement in either direction with relation to the rod 13. Disposed upon opposite sides of the rod 13 are L-shaped arms 49 and 50, which are rigidly connected and preferably cast integral therewith. These arms are disposed above and near the arms or links 35 and 37 respectively, as shown. The arms 49 and 50 carry at their rear ends pins or bolts 51 and 52 respectively, upon which are disposed blocks 53 and 54. Disposed upon opposite sides of the block 53 are suitably stiff compressible coil springs 55 and 56, engaged by approximately hook-shaped links 57 and 58 respectively. The link 58 is pivotally connected with the arm 34, as shown at 59, and the link 57 is pivotally connected with the arm 35, as shown at 60. The block 53, and associated elements are mounted within a casing or housing 61, slidably mounted upon the elements 57 and 58 and connected with arm 49, at 51'. The block 54 is engaged by suitable stiff compressible coil springs 63 and 64, which are in turn engaged by approximately hook-shaped links 65 and 66. The link 65 is pivotally connected with the arm 36, as shown at 67 and the link 66 is pivotally connected with the arm 37, as shown at 68. A housing or casing 69 surrounds the block 54 and associated elements, such housing being identical with the housing or casing 61.

The operation of the apparatus is as follows:—The springs 55 and 56 draw the arms 34 and 35 inwardly, while the springs 63 and 64 draw the arms 36 and 37 inwardly, whereby the shoes 30 are held in clamping engagement with the sides 32 of the casing 18. This is when the mechanism is in its normal locked condition. It is thus seen that if the steering wheels 8 strike an obstruction in the road-bed, which would tend to swing them in either direction, such movement would be transmitted to the forward longitudinal rod 13. Assuming that this movement tends to move the rod 13 rearwardly, such movement will be transmitted to the arms 49 and 50, and to the links 35 and 37 through the medium of the yielding connecting means therebetween. It is thus seen that this movement will tend to swing the arms 35 and 37 inwardly for increasing the clamping engagement between the shoes 30 and the sides 32. This longitudinal movement of the rod 13 will be very slight as such movement is opposed by the springs 55 and 63, which are to be constructed suitably stiff, and strong. These springs quickly return the rod 13 to its normal position. The rearward longitudinal movement of the rod 13 is positively limited by the engagement of the stop ring 26 with the sleeve 25 which is now being held against longitudinal movement by the locking means. It is obvious that if the rod 13 is moved forwardly, the arms 49 and 50 and associated elements will swing the arms 34 and 36 forwardly and inwardly, whereby the shoes 30 are firmly clamped against the sides 32 of the casing 18. It is thus seen that the slight longitudinal movement of the rod 13 in either direction cannot be transmitted to the rod 16. When it is desired to swing the steering wheels in either direction, the operator turns the steering handle or member 17, which effects a longitudinal movement of the rod 16. When the rod 16 is moved forwardly, the pin or bolt 43 being in engagement with the rear end wall 45 of the slot or opening 44, the arms 35 and 37 will be moved forwardly and outwardly, to draw the shoes 30 inwardly out of engagement with the sides 32 of the casing 18. This inward movement of the shoes 30 will also cause the arms 34 and 36 to move outwardly and rearwardly. It is thus seen that upon the forward longitudinal movement of the rod 16, the arms of the toggle-joint structure will be spread or moved apart, whereby the shoes 30 will be moved out of clamping engagement with the sides 32. The longitudinal movement of the rod 13 in the same direction, is continued until the pin or bolt 47 is moved from its normal central position to engage the forward end wall of the slot or opening 48, when further longitudinal movement of the rod 16 in the same direction will positively move the rod 13 in that direction. Upon the release of the lever or member 17, the springs will instantaneously force the shoes 30 outwardly for clamping engagement with the sides 32 of the casing 18. When the rod 16 is moved rearwardly, the pin or bolt 40 engaging the forward end wall 42 of the rod 16, the arms 34 and 36 are moved rearwardly and outwardly, whereby the shoes 30 are moved out of clamping engagement with the sides 32 and the arms 35 and 37 are moved forwardly and outwardly. The rearward longitudinal movement of the rod 16 is continued until the pin or bolt 47 engages the rear end wall of the opening or slot 48, whereupon, any further longitudinal movement of the rod 16 will positively move the rod 13 in the same direction. As soon as the steering handle or member 17 is released the spring will instantaneously return the shoe 30 to clamping engagement with the sides 32 of the casing 18. Attention is called to the fact that in the event of the wheels becoming cramped in soft ground or snow, the toggle-joint arms or levers 34, 36, and 35, 37, form levers of the second class, whereby the pressure on the rod 13 is double that applied to the rod 16 by means of the steering handle or member. As soon as the clamping engagement of the shoes 30 is released, this leverage is destroyed, and the pressure transmitted directly.

It is to be understood that the form of my invention, herewith shown and described, is to be taken as a preferred example of the same, and that certain changes in the shape, size and arrangement of parts may be resorted to without departing from the spirit of the invention or the scope of the subjoined claims.

Having described my invention, I claim:—

1. In apparatus of the character described, a plurality of longitudinally movable rods arranged in coöperative relation, locking means connected with one rod and operated upon the longitudinal movement of the same, and means connected with the locking means and with the other rod to release the locking means upon the longitudinal movement of the last named rod.

2. In apparatus of the character described, a plurality of longitudinally movable rods arranged in end to end relation, locking means connected with one longitudinal rod and operated upon the longitudinal movement of the same, means connected with the locking means and with the other longitudinal rod to release the locking means upon the longitudinal movement of the last named rod, and connecting means between the longitudinal rods whereby one may move the other upon the release of the locking means.

3. In apparatus of the character described, a plurality of longitudinally movable rods, connecting means between the same, means positively preventing one rod from moving the other rod, and means operated upon the slight longitudinal movement of the last named rod to operate the last named means, whereby the last named rod upon further longitudinal movement thereof in the same direction will move the first named rod longitudinally.

4. In apparatus of the character described, a plurality of longitudinally movable operating and operated rods disposed in end to end relation, a fixed structure disposed near the rods, brake shoes pivotally connected with the operated rod and engaging the fixed structure, control means for the shoes, connecting means between the control means and the operated rod whereby the shoes are forced into clamping engagement with the fixed structure upon the longitudinal movement of the operated rod in either direction, connecting means between the control means and the operating rod whereby the shoes are moved out of engagement with the fixed support upon the longitudinal movement of the operating rod in either direction, and means whereby the operating rod will move the operated rod after the release of the shoes.

5. In apparatus of the character described, reciprocatory operating and operated elements disposed in end to end relation, brake means connected with the reciprocatory operated element and adapted when set to positively prevent the operated element from partaking of reciprocatory movements in either direction, and means connected with and operated by the movement of the reciprocatory operating element in either direction to release the brake means.

6. In apparatus of the character described, a movable driving element, a movable driven element disposed near the driving element, a relatively stationary structure disposed near said elements, brake shoes movable into and out of engagement with the relatively stationary structure, connecting means between the brake shoes and the driven element, a toggle-joint structure connecting the brake shoes, means connecting the toggle-joint structure with the driven element and adapted to operate the same for forcing the shoes into clamping engagement with the relatively stationary structure upon the movement of the driven element, and connecting means between the driving element and the toggle-joint structure adapted to operate the toggle-joint structure to move the shoes out of clamping engagement with the relatively stationary structure when the driving element is moved.

7. In apparatus of the character described, a driving rod, a driven rod disposed near the same, a relatively stationary structure, brake shoes disposed upon opposite sides of the driving rod and adapted for movement into and out of engagement with the relatively stationary structure, a toggle-joint structure connected with the brake shoes, spring means for normally operating the toggle-joint structure to force the brake shoes into engagement with the relatively stationary structure, connecting means between the spring means and the driven rod and connecting means between the toggle-joint structure and the driving rod.

8. In apparatus of the character described, a reciprocatory driving rod, a reciprocatory driven rod disposed near the same, lost-motion connecting means between the reciprocatory driving rod and reciprocatory driven rod, normally set brake means to limit the movement of the driven rod so that the same is positively prevented from moving the driving rod, means connecting the brake means with the driven rod, and means operated upon the slight movement of the driving rod to release the brake means and subsequently move the driven rod.

9. In apparatus of the character described, reciprocatory operating and operated elements disposed in end to end relation, brake means connected with the reciprocatory operated element and adapted when set to positively prevent the operated element from partaking of reciprocatory movements in either direction, and means connected with and operated by the movement of the reciprocatory operating element in either direction including a toggle-joint structure, to release the brake means.

10. In apparatus of the character described, a plurality of relatively movable elements to be moved one by the other, relatively stationary tracks arranged upon opposite sides of said elements, shoes arranged to have clamping engagement with the tracks, a longitudinally expansible and contractible device connected with the shoes, connecting means between said device and one element, connecting means between said device and the other element, and additional connecting means between the shoes and one element.

11. In apparatus of the character described, the combination with a plurality of reciprocatory rods adapted to be moved one by the other and one of which is provided with spaced longitudinal slots, relatively stationary tracks arranged upon opposite sides of the rods, shoes to engage with the tracks, pairs of links pivotally connected with the shoes, pins pivotally connecting the inner ends of the links in said pairs and extending into the longitudinal slots, means connecting the shoes with one rod, and means connecting the links with one rod.

In testimony whereof I affix my signature in presence of two witnesses.

GORDON A. REAM.

Witnesses:
G. WELCH,
THEODORE E. SHELDON.